United States Patent [19]

Nickerson

[11] 3,740,485

[45] June 19, 1973

[54] CENTRAL OFFICE PRIVATE BRANCH EXCHANGE TELEPHONE SYSTEM

[75] Inventor: Charles Nickerson, Poulsbo, Wash.

[73] Assignee: American Telephone and Telegraph Company, New York, N.Y.

[22] Filed: Nov. 24, 1971

[21] Appl. No.: 201,918

[52] U.S. Cl. ...... 179/18 AD, 179/18 BC, 179/18 FA

[51] Int. Cl. ........................................... H04m 3/58

[58] Field of Search .................. 179/18 AD, 18 FA, 179/18 BC, 18 HA, 26, 27 FC, 27 CA, 99

[56] References Cited

UNITED STATES PATENTS

| | | | |
|---|---|---|---|
| 3,333,062 | 7/1967 | Young | 179/27 CA |
| 3,133,994 | 5/1964 | Zarouni | 179/18 BC |
| 3,441,678 | 4/1969 | Budlong | 179/18 BC |
| 3,609,249 | 9/1971 | Pinede | 179/99 |
| 3,239,610 | 3/1966 | Morse et al. | 179/42 |

*Primary Examiner*—Thomas W. Brown
*Attorney*—N. S. Ewing and R. B. Ardis et al.

[57] ABSTRACT

Private branch exchange service is provided by the switching network of a telephone central office. The PBX attendant is provided with a console which includes circuitry for completing calls to PBX subscriber stations through the use of dial transfer circuits in the central office. Loops for the PBX attendant console comprise lines of the central office which are associated with a PBX main station directory number and the PBX subscriber stations also employ lines of the central office. However, these stations can be reached only through the action of the PBX attendant's console and the PBX stations do not have directory numbers of the telephone offices associated therewith.

7 Claims, 11 Drawing Figures

CENTRAL OFFICE PRIVATE BRANCH EXCHANGE TELEPHONE SYSTEM

BACKGROUND OF THE INVENTION

1. Field of the Invention

This invention relates to private branch exchange telephone systems.

2. Description of the Prior Art

A private branch exchange telephone system, commonly termed a PBX, is employed to provide service to a business customer having a need for both internal and external telephone communication. Heretofore the PBX system has included at least dedicated switching networks on the premises of the business customer. There are many types of private branch exchange equipments, e.g., step-by-step, crossbar, and a majority of these equipments comprise dedicated control units on the business customer's premises in addition to the dedicated switching networks. There is one priorly known type switching equipment described in U.S. Pat. No. 3,225,144, which issued on Dec. 21, 1965, naming as inventors R. C. Gebhardt et al. In this patent dedicated switching units are located on the business premises and common control apparatus shared by a number of private branch exchanges is located on telephone company premises or in a location central to a group of businesses served by respective PBXs.

By definition, PBX service requires that calls from outside the PBX to stations of the PBX be completed through the intervention of a PBX attendant. Intra-PBX calls and calls from PBX stations to stations outside the PBX may be completed without attendant intervention.

Additionally, in PBX systems charges for outward dialed calls from the PBX are billed to a particular line associated with the PBX outward dialing, or identification to a particular PBX station is accomplished through attendant intervention.

There is a competing telephone service for businesses which is termed Centrex. This service is characterized by Direct Inward Dialing (DID) of Centrex subscribers. In Centrex systems charges for outward dialed calls are made to the specific Centrix stations originating the calls.

Centrex service may be provided by dedicated switching systems on a customer's premises or by large central office switching systems in a telephone central office. In either case, Centrex service requires the use of complex attendant's consoles along with complex dedicated data links between the switching system and an attendant console. Furthermore, such arrangements require physical alteration of the switching system to provide connections to such data links.

SUMMARY OF THE INVENTION

In accordance with the present invention, PBX service is provided without the need for a dedicated switching network either on the customer's premises or in a telephone central office through which service is provided. In accordance with one aspect of this invention, a telephone line circuit which comprises means for providing a visual indication of the busy and idle states of a line connected to the line circuit maintains the appropriate visual indications without interruption during dial outpulsing and during the application of interrupted ringing signals to the line without reliance on electromechanical elements such as relays.

BRIEF DESCRIPTION OF THE DRAWING

This invention may be understood from the following description when read with respect to the drawing in which.

DETAILED DESCRIPTION

Figure 1:
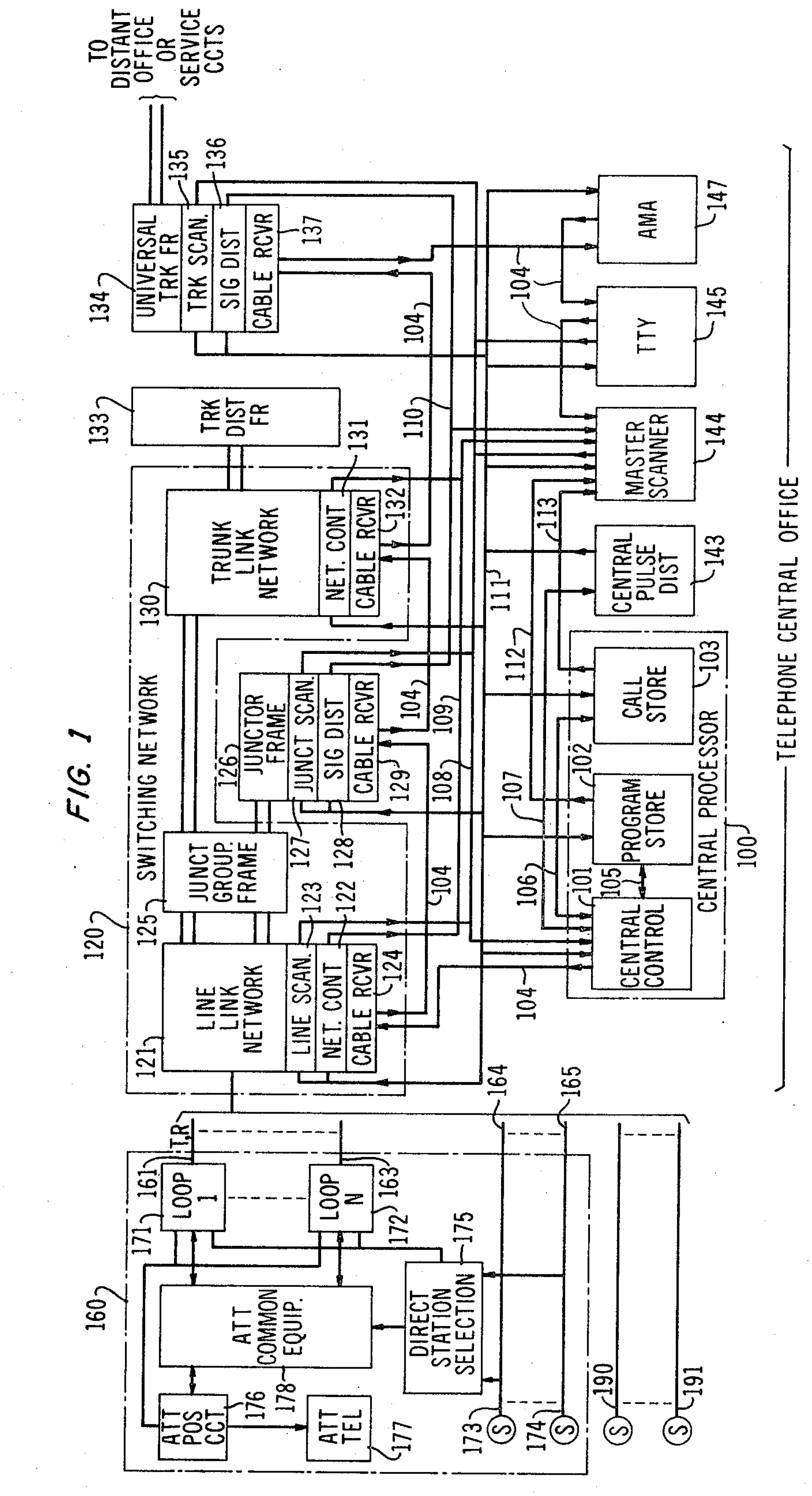
FIG. 1 is a schematic diagram of a private branch exchange system in which service is provided through an illustrative electronic telephone switching system.

The illustrative embodiment of this invention which is shown in FIG. 1 utilizes the services of an electronic telephone switching system such as is shown in U.S. Pat. No. 3,570,008 which issued on Mar. 9, 1971 and which named as inventors R. W. Downing, H. F. May, F. F. Taylor, and W. Ulrich. The only connections between the private branch exchange apparatus 160 on the customer's premises and the telephone central office of FIG. 1 is by means of the lines 161 through 165. Certain of these lines, e.g., 161, 162, are connected to attendant loop circuits 171, 172, while others of these lines are connected to PBX subscriber stations 173 and 174. The lines 161 through 163 may be employed to originate calls from the attendant's position and are employed in the completion of all incoming calls to subscribers of the PBX. The lines 164, 165 which are connected to the PBX subscriber stations 173, 174 are employed in the origination and completion of intra-PBX calls and both incoming and outgoing calls between the subscriber station 173 and a telephone subscriber within or outside of the PBX.

The attendant loop circuits 171 are dedicated on a one-for-one basis to the respective lines 161, 163 which interconnect the central office and the attendant's equipment. The Direct Station Selection apparatus 175 permits efficient completion of calls by the PBX attendant to subscriber stations of the PBX. The attendant's position circuit 176 and the attendant's telephone set 177 provide keys and lamps for attendant control and supervision of calls handled by the attendant; and the attendant's common equipment 178 is basically a source of power and timing pulses.

The telephone switching system of FIG. 1 includes the three-port conference trunk circuit of FIG. 10 which will be described with respect to the completion of a call by a PBX attendant. This central office provides the necessary originating and terminating translations for providing private branch exchange service through the simplified private branch exchange system arrangements 160. Additionally, the central office includes provisions for limiting the number of simultaneous PBX connections.

The operation of the illustrative arrangements shown in the drawing can best be understood by the description of typical calls. A first call which is completed under what is termed "attendant manual control" will be described and then a call handled by means of the Direct Station Selection equipment will be described. Attendant originated calls to a PBX subscriber station or to a station of the telephone central office will not be described since such calls are completed in the same manner as any call originating from a line served by the telephone central office of FIG. 1. However, the measures which limit the number of simultaneous calls to and from stations outside the PBX will be described.

INCOMING CALL TO PBX SUBSCRIBER STATION

Subscriber stations of the PBX 160 are reached from telephones outside the PBX over the lines 161 through 163 which are assigned a PBX "main station" directory number. This directory number is a directory number of the switching system of the telephone central office and comprises as many digits as are required to identify a subscriber station of that office. There are three lines, 161 through 163, shown interconnecting the PBX equipment 160 and the telephone central office. However, in actual practice the number of lines provided is an engineering determination which is based upon calling requirements of the PBX.

A typical call from subscriber, e.g., 190 of the telephone central office, to one of the subscriber stations, e.g., 173 of the PBX 160, is originated by the subscriber 190 removing his handset from its rest position and upon receiving dial tone outpulsing by dial pulses or by TOUCH-TONE signals the directory number of the "main station" of the PBX 160. The telephone central office is arranged to provide a connection through the switching network 120 between the calling subscriber, e.g., 190, and the first idle line of the group of lines 161 through 163 and to apply ringing current to that chosen idle line.

The lines 161 through 163, as previously explained, terminate in the loop circuits 1 through N of FIG. 1. The details of such a loop circuit are set forth in FIG. 8. Ringing current received over the tip and ring conductors 801, 802 is applied to the light source 803 of the ring detector circuit through resistor 805. The light source 803 is light coupled to the cell 804. Ringing current through the light source 803 causes light to fall upon the cell 804 which serves to reduce the resistance of the cell. The cell 804 is connected in series between the positive voltage which is connected to one end thereof and ground. The remainder of the series circuit comprises the resistor 806, the varistor 808, and the resistor 810. The varistor 808 serves to hold transistor 809 in the off state and the resistance of the cell 804 in series with the resistors 806 and 810 provides a voltage divider which serves to turn on the transistor 809 when ringing current is applied to the light source 803. The light source 803 and cell 804 are employed to provide isolation between the line conductors 801, 802 and the detector circuit and to provide protection against noise which might tend to cause a false incoming request signal. Light sources and cells such as 803 and 804 are employed elsewhere in the illustrative PBX circuitry. Hereinafter such combination will be referred to merely as a light coupled signal detector. It should be noted that signal detectors of this type respond to AC and DC applied signals.

The previously enumerated voltage divider circuitry comprises the cell 804, the resistor 806, the varistor 808, and the resistor 810 which are employed to provide forward base to emitter bias for the transistor 809 upon the receipt of ringing current. The transistor 809, under these conditions, will conduct and will place the conductor 811 at a potential near ground. A ground potential signal on conductor 811 serves to turn off the transistor in the gate 813 which is connected in a flip-flop relation with the gate 812. This flip-flop, which comprises the gates 813 and 812, is proportioned to have two stable positions, one wherein the transistor in the gate 813 is conducting and the transistor in the gate 812 is off, and the other where the transistor in gate 812 is conducting and the transistor in gate 813 is off.

When the gate 813 is in the off state the conductor 814 goes positive. Signals on conductor 814 comprise one of the two inputs to the gate 815. The other input to the gate 815 comprises 60 interruption per minute pulses (60 I.P.M.) on the R conductor 728. The 60 I.P.M. pulses on the R conductor 728 are generated in the interrupter circuit 720 of FIG. 7 in response to signals from the clock circuit 719. The gate 815 turns on and off with the occurrence of the 60 I.P.M. pulses and thus provides high and low signals, respectively, on conductor 816. The signals on conductor 816 serve to activate the loop lamp 817 at the 60 I.P.M. pulse rate. This appears to the attendant as a relatively slow flashing of the loop lamp 817.

The loop lamp 817, during the course of a call, is illuminated from a plurality of pulse sources to provide discrete visual signals to the attendant in accordance with the state of the call which is being handled by the loop circuit associated with the particular loop lamp 817. There is one loop lamp, e.g., 817, and a corresponding loop key, e.g., 818, associated with each loop circuit, e.g., 171. The loop key 818 is a nonlatching key which can be momentarily operated and released.

Figure 7:
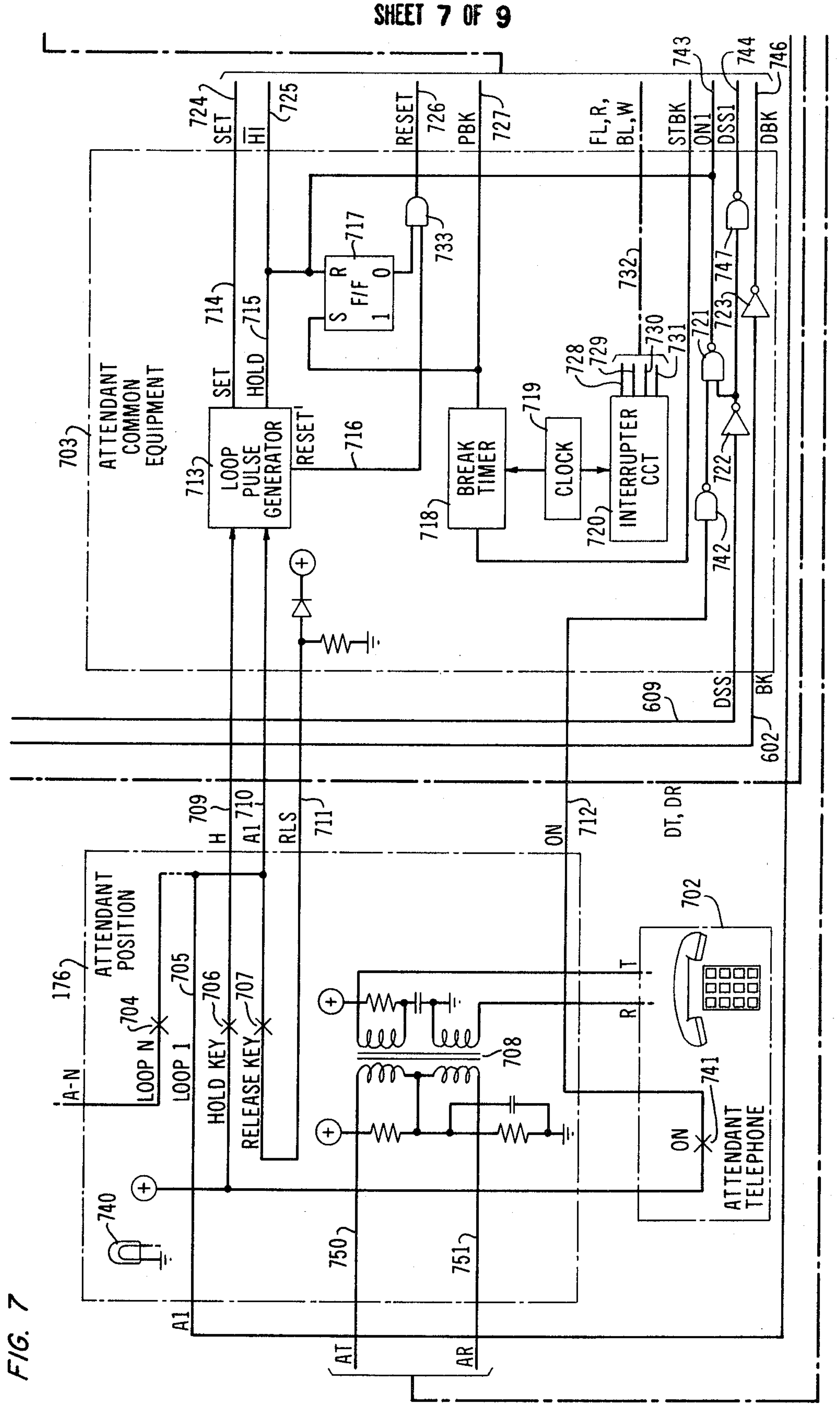
FIG. 7 is a schematic diagram of the attendant's common equipment, the attendant's position circuit, and the attendant's telephone set of FIG. 1.

In response to the illumination of the loop lamp 817 at the 60 I.P.M. rate, the attendant depresses the corresponding loop key 818 to terminate ringing in the central office and to connect the attendant's telephone to the selected loop circuit. The loop lamp 817 and its associated key 818, which are shown in the dotted line labeled 819, are but one of the plurality of keys and lamps of the attendant's position 176 which is shown in FIG. 7.

The momentary depression of a loop key, e.g., 818, activates the loop pulse generator 713 and the gate 820 of the corresponding loop circuit. The A1 conductor 710 is connected to a source of positive potential in the loop pulse generator 713 through a lamp such as the lamp 803. The lamp of the loop pulse generator 713 is part of a lamp and cell combination which, when activated, initiates the generation of a sequence of pulses termed reset', hold, and set. The reset' pulse is approximately 30 milliseconds in duration and originates approximately 10 milliseconds after closure of a loop key, e.g., 818. The hold pulse has a 20 millisecond duration and originates approximately 70 milliseconds after the completion of the reset' pulse. The set pulse also has a duration of approximately 20 milliseconds and immediately follows the end of the hold pulse. The reset', the hold, and set pulses occur in the above sequence on their corresponding conductors 716, 715, and 714 in response to the depression of any one of the loop keys of the attendant's position. The positive potential from the lamp and the loop pulse generators 713 is connected through the depressed loop key, e.g., 818, to an input of the gate 820 and to an input of the gate 821.

The reset pulse on the conductor 726 corresponds generally in time and duration to the reset' pulse on conductor 716. For this above condition it is essential that the flip-flop 717 is in the "0" state and the gate 733 is enabled. The setting of the flip-flop 717 which serves to mask out the reset pulses will be described subsequently.

Figure 8:
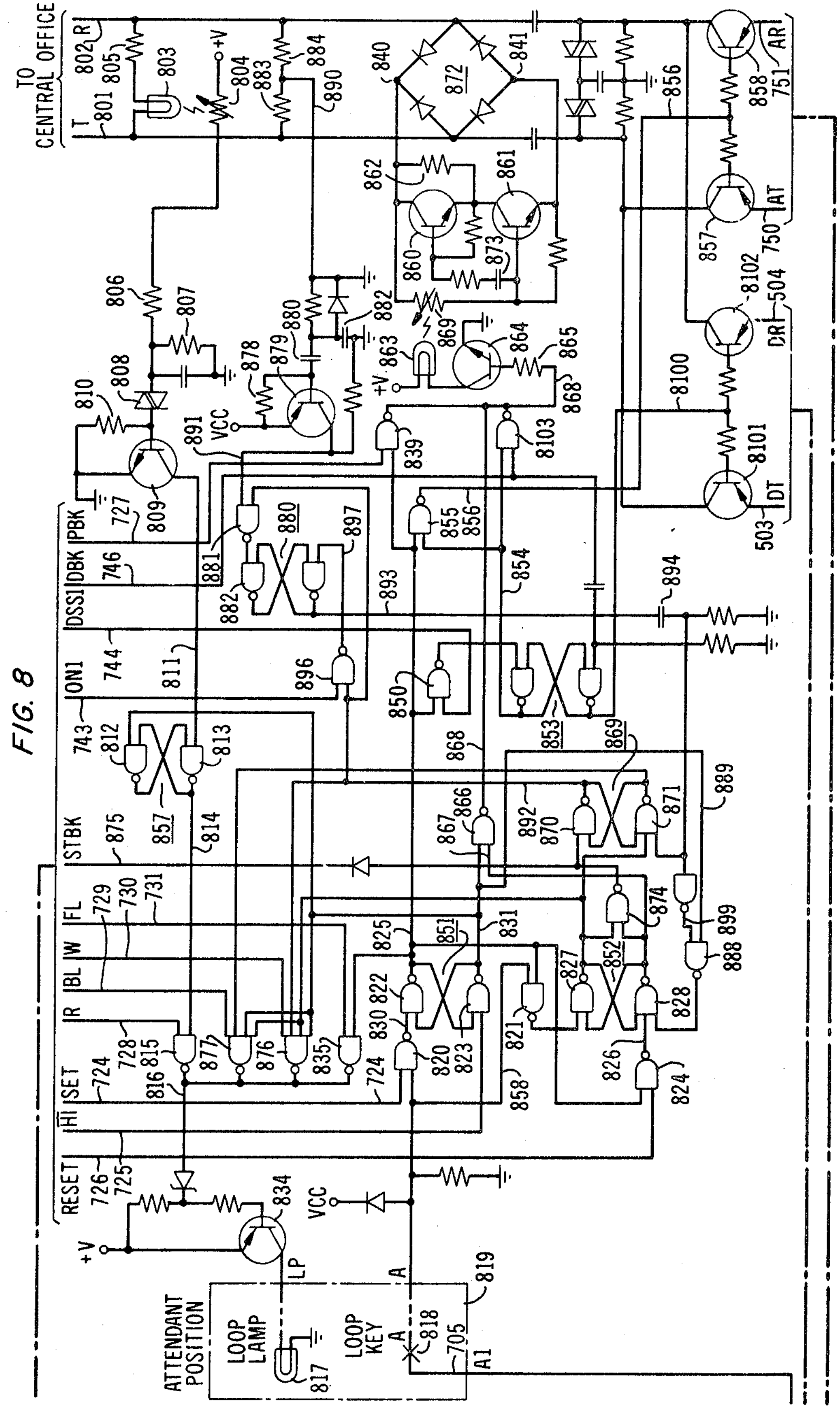
FIG. 8 is a schematic diagram of an attendant's loop circuit of FIG. 1.

The reset pulse on conductor 726 is multipled to gates of the loop circuits corresponding to gate 824 in FIG. 8. A second input to the gate 824 is the output conductor 825 which is one of the outputs of the flip-flop 851 which comprises the gates 822 and 823. As will be explained immediately hereafter, the conductor 825 of a loop circuit which has been seized to answer a call will be in the high state at the time of occurrence of the reset pulse on conductor 726. Accordingly, the gate 824 of a loop circuit in which the flip-flop 851 is in the set state will be enabled and thus produce a low signal on the conductor 826. This signal serves to reset the hold flip-flop 852 which comprises the gates 827 and 828. The utilization of the hold flip-flop will be described later herein.

The hold signal pulse generated on the conductor 725 serves to reset the seize flip-flops 851 (which comprise the gates 822 and 823) in each of the loop circuits. This prepares the loop circuits for seizure by the attendant.

We may now return to a description of the operation of the gate 820. The simultaneous occurrence of the set pulse on conductor 724 and the positive signal through the loop key 818 serves to enable the gate 820 and provide a low signal on conductor 830. This low signal serves to: set the seize flip-flop 851; provide a high signal on conductor 825; and a low signal on conductor 831. Accordingly, the seize flip-flop 851 of the loop circuit which has been seized by an attendant is in the set state after the occurrence of the set pulse on conductor 724.

The low signal on conductor 831 serves to reset the ringing flip-flop 857. This places the conductor 814 in the low state which, in turn, disables gate 815 and removes the 60 I.P.M. signals on conductor 728 from the loop lamp 817. At the same time the high signal on conductor 825 enables gate 835 so that 480 interruptions per minute pulses (480 I.P.M. are connected through gate 835 to turn the transistor 834 on and off at the 480 I.P.M. rate. Accordingly, at this time the loop lamp 817 of the attendant's position flashes rapidly to indicate to the attendant that she has seized the corresponding loop.

The setting of the seize flip-flop 851, in addition to changing the rate at which the loop lamp is illuminated, also serves to connect the attendant's telephone 702 to the tip and ring conductors 801 and 802 of the line to the central office, e.g., 161, associated with the seized loop circuit and to set the hold flip-flop 852 of that loop circuit. The hold flip-flop 852 is set when the gate 821 is enabled by the occurrence of a high signal on the conductor 825 and a high signal on the conductor 858.

The high signal on conductor 825 and a high signal on conductor 854 enables the AND gate 855 and thus places a low signal condition on conductor 856. This low signal condition serves to: enable the serially connected transistors 857 through 858 and place the attendant's telephone set 702 in communication with the line with the central office, e.g., line 161, via the transformer 708, the AT and AR conductors 750, 751, the transistors 857, 858, and the conductors bypasses The low signal condition on conductor 831 turns off the gate 866 to produce a high signal condition on conductor 868. This high signal condition serves to turn on transistor 864 by forward biasing its base to emitter junction trough the resistor 865. Conduction by the transistor 864 serves to illuminate the lamp 863 which is coupled to the light detecting cell 869. Illumination of the lamp 863 serves to turn on transistors 860 and 861. The transistor 860 b passes the resistor 862 (1,500 ohms) and completes a brief short circuit condition across terminals 840 and 841 of the full wave rectifier 872. This short circuit condition is transmitted to the tip and ring conductors 801 and 802 via the bridge rectifier 872. The short condition, when received at the central office, serves to indicate answer by the called attendant and, thus, the switching system in the central office removes ringing current from the line. The transistor 860 remains on only momentarily due to the presence of the capacitor 873 in series with the base terminal thereof. When the transistor 860 returns to the nonconducting state the holding bridge for the central office line, e.g., 161, comprises bridge rectifier 872, the 1,500 ohm resistor 862, and the conducting transistor 861. The 1,500 ohm resistor 862 in series with the bridge rectifier in the line conductors serves to hold the connection to the central office.

The attendant of the PBX is placed in voice communiction with the calling subscriber, e.g., the subscriber from the station 190. The subscriber announces to the attendant the number of the PBX line to which connection is desired. The PBX attendant may complete the call manually through the use of the loop key in her attendant's position circuit and by means of the TOUCH-TONE set of her telephone 702, or she may complete the connection by means of the Direct Station Selection apparatus of FIGS. 2 through 6. For the purposes of this discussion it is assumed that a PBX subscriber station may be reached by a four-digit code. This four-digit code comprises a first digit which defines the PBX, a second digit which defines the hundred group of the lines of the PBX, while the remaining two digits defined the particular line within that hundred group.

The operation of a switching system in completing a call to a PBX subscriber station will first be described with respect to manual completion of the cell by the attendant and then by Direct Station Selection completion of the call.

Figures 10, 10A:
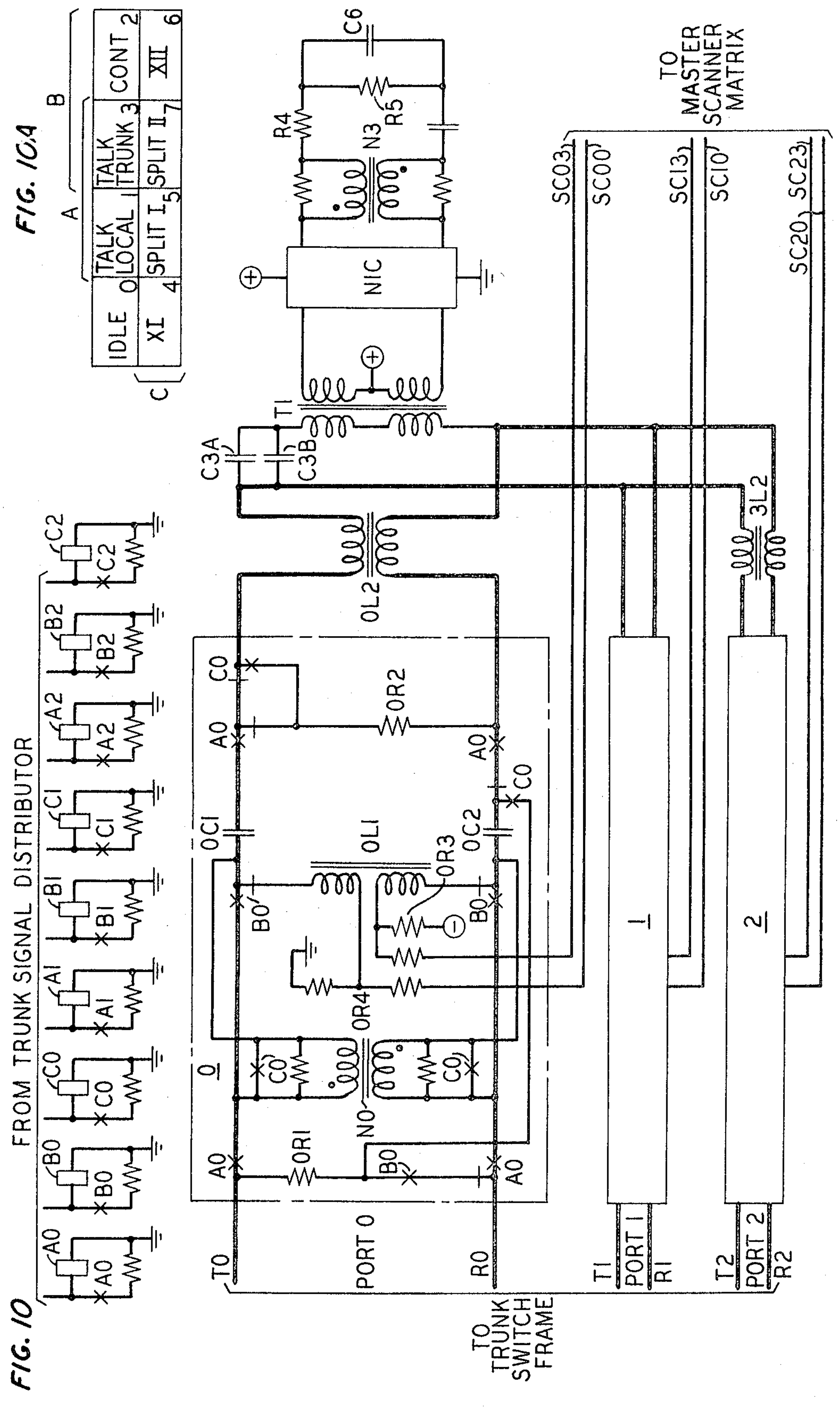
FIG. 10 is a schematic diagram of a three-port conference trunk of the central office of FIG. 1.
FIG. 10A is a state diagram for each of the sets of A, B and C relays of FIG. 10.

In manual completion the attendant, after receiving the identity of the called PBX station from the calling station, depresses the loop key to obtain service of a three-port conference circuit such as is shown in FIG. 10. At this state of the call the seize latch 851 and the hold latch 852 of the loop circuit which has been used to complete the call will both be in the set state and the remaining flip-flops of the loop circuit will be in the reset state.

Depression of the loop key again initiates operation of the loop pulse generator 713 to cause generation of the reset', hold, and set pulses and to provide a positive signal on the conductor 858. At the time of occurrence of this action the seize flip-flop 851 is already in the set state. Therefore, upon depression of the loop key the gate 821 will be enabled by positive signals on conductor 825 and on conductor 858. The output of the gate 821, therefore, goes to the low signal condition which tends to cause the gate 827 of the hold flip-flop 852 to go to the non-conducting state. However, at the occurrence of the reset pulse on conductor 726, the gate 824 will be enabled by that pulse and a high signal condition on conductor 825. The resulting low signal condition on conductor 826 will tend to turn off the gate 828. With low signals being present at the input terminals of the gates 827 and 828 this cross coupled pair of gates forming the hold flip-flop 852 will not appear to be a flip-flop but, rather, will appear as a pair of independent uncoupled gate circuits in which the output of both circuits is in the high state. Under this condition the gate 874 will be enabled to provide a low signal condition at the output thereof on conductor 875. This low signal condition will serve to set the answer flip-flop 869 which comprises the gates 870 and 871. At the same time, the low signal condition on conductor 875 will be transmitted to the break timer circuit 718 to initiate generation of a pulse of relatively precisely timed duration to be employed in signaling the central office.

Before proceeding to a discussion of the utilization of the output signal of the break timer 718, the effect of the setting of the answer flip-flop 869 should be examined. The loop lamp 817 continues to flutter at the 480 I.P.M. rate until the attendant proceeds to answer a call on another loop circuit. However, operation of the answer flip-flop 869 establishes conditions for changing the rate at which the lamp is illuminated at the time the next call is answered. The gate 876 is employed during the holding of an operator completed call to illuminate the loop lamp 817 at a rate intermediate the 60 I.P.M. rate and the 480 I.P.M. rate. One hundred twenty interruption per minute pulses from the interrupter circuit 720 are transmitted to the gate 876 via the conductor 730. The signals on conductor 730 are termed "wink" signals and have the characteristic that the duration of pulses is long compared to the interval of time between successive pulses. This causes the lamp 817 to be illuminated in a manner which is termed "wink." It should be noted that on attendant originated calls only, the attendant will place the call on hold without having depressed the loop key 818 to signal the central office. In that case the gate 877 will be enabled to transmit the pulses on conductor 729 to the loop lamp 817. The pulses on the conductor 729 also occur at 120 interruptions per minute. However, these signals have the characteristic that the pulse duration is short compared to the time between successive pulses. Illumination of the loop lamp 817 by signals on conductor 729 is termed "blinking" of the lamp. From the above description it is seen that the input conductors to the gate 876, with the exception of conductor 831, are in the high state. Thus preparation has been made to transfer the rate at which the loop lamp 817 is illuminated at such time as the seized flip-flop 851 is reset. This, as described later herein, will occur at such time as the attendant proceeds to answer another call by depressing a further loop key.

We may now return to examine the effect of the low signal condition on the conductor 875. This low signal condition serves to energize the break timer 718. The break timer 718 is under the control of output signals of the clock 719 and serves to generate a pulse of approximately 500 milliseconds duration on the PBK conductor 727. Within the attendant's common equipment the output signal of the break timer 718 serves to set the flip-flop 717 to the "1" state and thus disables gate 733. So long as the flip-flop 717 is set the reset pulses will be eliminated.

The break timer output pulse is utilized to generate an "open circuit" condition or break from the loop circuit to the central office via the connected line, e.g., 161. The PBK conductor 727 in conjunction with the high signal condition on the conductor 825 serves to enable the gate 879. When the gate 839 is enabled the conductor 886 is placed in the low signal condition and the transistor 864 is turned off. As previously explained, the transistor 864 was turned on to illuminate the lamp 863 which, in turn, served to transmit an answer signal and a subsequent hold signal to the central office via the bridge rectifier circuit 872. Since the break signal persists for approximately 500 milliseconds the lamp 863 will go dark for approximately that period of time and the transistor 861 will stop conducting. Accordingly, the holding loop which comprised the 1,500 ohm resistor 862 and the transistor 861 will be in the open state for the break period of time.

This break corresponds to an on-hook condition from a normal subscriber station served by the switching system of the telephone central office. The central office is equipped to recognize such "on-hook flashes" and to provide access to circuitry for initiating call transfer. Understanding of the precise operation of the central office is not required for an understanding of this invention. However, for purposes of completeness a three-port conference trunk circuit of the central office is shown in FIG. 10.

The three-port conference trunk circuit, also termed a three-port dial transfer trunk circuit herein, comprises three sets of A, B, and C control relays for the three ports of the circuit. In FIG. 10 the relays AO, BO, and CO are associated with the zero port and the remaining relays are associated with their respective ports in accordance with the suffixes in the labels of those relays. To the right of FIG. 10 is shown the state diagram, FIG. 10A, for each set of A, B, and C relays. In this diagram the A relay is given a numerical weight of one, the B relay is given a numerical weight of two, and the C relay a numerical weight of four. The numbers within the eight boxes of the state diagram comprise the sums of the weights of the relays operated to achieve the respective states. For example, the "talk local" state has the number one associated therewith. Accordingly, only the A relay is operated when the respective port is in the "talk local" state. Similarly, the "talk trunk" state which has the value of three associated therewith requires the operation of the A and B relays to achieve that state.

When the central office receives the 500 millisecond break over a PBX line, the central processor therein assigns an idle three-port trunk circuit to the call and establishes and reserves the following connections:

1. the PBX line, e.g., 161, is connected through the switching network 120 to a digit receiver circuit (not shown);
2. the calling party is connected to a port, e.g., port 2 of the circuit of FIG. 10 which at this time is placed in the split I or split II state, depending on whether the calling party is a subscriber of the central office or a subscriber of a distant office and is connected to the central office via a trunk circuit, respectively;

3. a path is reserved through the switching network 120 between the PBX line, e.g., 161, and a further port, e.g., port zero of the circuit of FIG. 10.

The digit receiver circuit is arranged to return dial tone to the PBX line until such time as a first digit has been received from that line. At the time the digit receiver is connected to the PBX line an originating register which comprises a plurality of words in the temporary memory 103 is also assigned to the call. At the time the request for transfer service is recognized by the central processor, the class of service of the line is determined. This class of service information is registered in the originating register and is subsequently utilized in the further processing of the call. In the present case the originating translation of the PBX line 161 will indicate that the call is from a PBX and therefore a limited number, e.g., four, digits will be sufficient to define a call to a subscriber station of that PBX. Accordingly, as the digits are received and recorded in the originating register, these digits will be examined in the light of the originating translation information and if, in fact, only four digits are received these will be treated as a complete number which is sufficient to establish a connection to the called PBX subscriber station. The processing of calls originated by a PBX attendant to non-PBX stations will not be described in further detail herein. However, it should be noted that calls to stations outside the PBX are distinguished by the attendant dialing prefix digits, e.g., the digit 9 to gain access to the general public network.

Each time the attendant depresses one of the TOUCH-TONE keys the OFF NORMAL contacts 741 are closed and a positive potential is applied to the input of the inverter 742, and thus a low signal condition exists at the input of the AND gate 721. The resulting high signal on ON1 conductor 743 is applied as an input to the gate 896 along with the high signal on conductor 892. Conductor 892 is high at this time since the answer flip-flop 869 has been set by prior action of the attendant. The abovedescribed signals on conductors 743 and 892 serve to enable the gate 896 which provides a low signal on conductor 897 to set the OFF NORMAL flip-flop 880. The output conductor 893 of the OFF NORMAL flip-flop will at this time go to the high signal condition. However, because of the presence of the capacitor 894, this change in state of the flip-flop 880 will not be further reflected. A description of the action which occurs at the time the OFF NORMAL flip-flop is reset is described later herein.

On completion of dialing, the central processor releases the connection through the network between the digit receiver and the PBX line and establishes the following connections:

1. a connection between a source of ringing supply and the called station;
2. connects the PBX line 161 to port zero through the previously reserved path through the network;
3. connects audible ringing to remaining port one through another path through the network; and
4. reserves a path between the called party and the port to which audible ringing is connected.

At this point in time the attendant hears audible ringing, the calling party hears nothing since the port to which the calling party is connected is in the split state, and ringing current is applied to the called subscriber's line.

If we assume that the called party answers in response to the applied ringing current, the central processor 100 will recognize this answer and will take action as follows:

1. remove the connection between the ringing source and the called party;
2. remove the connection between audible ringing and the port of the trunk circuit of FIG. 10;
3. establish a path between the called party and the port of the trunk circuit from which the audible ringing was removed; and
4. return break supervision to the PBX line to indicate answer by the called subscriber station.

The break supervision, i.e., battery and ground are momentarily removed from the PBX line, is recognized in the loop circuit of FIG. 8 by the break detector which comprises the resistors 883, 884, the transistor 879, and the circuit elements interconnecting these enumerated elements. The resistors 883 and 884 are of relatively large value, e.g., 18,000 ohms each, and are chosen to be of equal value within only a small amount. With these chosen values, the resistors 883 and 884 do not affect supervision to the switching system of the central office and do not adversely affect transmission between the attendant and the central office. Furthermore, by maintaining the resistors 883 and 884 of substantially equal value, no circuit unbalance results. It should be noted that the break detector recognizes opens or on-hook signals transmitted from the central office to the PBX attendant and ignores open signals transmitted from the PBX attendant to the central office. This is possible since the break detector operates upon the presence or absence of potential from the central office rather than the presence or absence of current flowing in the line. In the steady state condition the point 890 which joins the resistors 883 and 884 is at approximately half the central office potential, namely at approximately negative 24 volts. This negative potential serves to charge the capacitors 887 and 885 and in the steady state the transistor 879 is nonconducting. However, at the time the loop break is sent from the central office the point 890 rises towards ground and the capacitors 885 and 887 discharge and the transistor 879 is momentarily put into the conducting or ON state. This generates a momentary positive signal condition on conductor 891. At this same time the conductor 892 is in the high signal state, therefore, the gate 881 is enabled and generates a low signal condition to the input of the gate 882 of the OFF NORMAL flip-flop 880. When the flip-flop 880 is reset the conductor 893 is placed in a low signal condition. The previously charged capacitor 893 is discharged and the gate 871 of the answer latch 869 is disabled. At the same time the discharge of the capacitor 894 serves to generate a high signal condition at the output of the inverter 899. However, since the seize latch 851 is in the set state as the attendant has not been removed from the call, the gate 888 will not be enabled and the hold flip-flop 852 will remain set. Accordingly, if the attendant has not been removed from the connection at the time the called party answers, the loop lamp 817 will continue to be illuminated at the flutter rate.

A further open circuit condition must be transmitted from the attendant loop circuit to the telephone central office in order to achieve connection of the calling and called parties. This loop open condition is achieved by the attendant again depressing the loop key. Since the seize latch 851 and the hold latch 852 are both in the set state at the time the loop key is depressed, the gate 874 will again be enabled as previously discussed, and a low signal will be transmitted over the STBK conductor 875 to initiate operation of the break timer 718 and subsequent generation of a break signal by turning off the transistor 864 and the light source 863.

Upon receipt of the break signal the central office will change the state of the relays of the port to which the calling party is connected to change that port from a split to the "talk local" or "talk trunk" state, as required. So long as the attendant continues to hold on the line, a three-way conversation will be maintained through the three-port trunk circuit. However, as soon as the attendant releases from the loop by depression of the release key or by seizing another loop, the central office will recognize the release by the attendant and will establish a new connection through the switch network 120 between the calling and called parties. At this time the three-port trunk circuit of FIG. 10 is released for further use.

The above-described procedure wherein the attendant was still holding on the loop circuit at the time the called party answered is a rather unusual circumstance. Generally, this situation would obtain only in the case of "executive transfer." In this situation the attendant first talks to the called party to advise that party of an incoming call and gives the called party the opportunity to reject the call.

In the usual case the attendant will operate the release key 707 to remove herself from the loop or will depress a further loop key to answer a subsequent call. In both of these cases positive potential will be applied to the A1 conductor 710 to initiate operation of the loop pulse generator 713. Accordingly, the reset', hold, and set pulses will be generated in sequence. The reset pulse is not generated at this time since the flipflop 717 has been previously set by operation of the break timer 718. Accordingly, at this time the set pulse will serve to reset the seize flip-flop 851; the hold flip-flop 852, the answer flip-flop 869, and the OFF-NORMAL flip-flop 880 will remain in the set state.

At such time as the called party answers the break supervision will be transmitted from the central office to the loop circuit via the line 161 and will be detected by the break timer. Detection of this break, as previously described, serves to reset the OFF-NORMAL flip-flop 880 and thus provide a low signal condition on the conductor 893 to discharge the capacitor 894. When the capacitor 894 discharges the gate 871 is disabled to reset the answer flip-flop 869 and, since the seize flip-flop 851 has been previously reset, the condition on conductors 899 and 889 will be such that the gate 888 is enabled to reset the hold flip-flop 852. With the resetting of the hold, answer, and OFF-NORMAL flip-flops the loop lamp 817 will return to the dark or idle state.

DIRECT STATION SELECTION CALL COMPLETION

The direct station selection equipment 175 is shown in FIGS. 2 through 6 of the drawing. The direct station selection equipment comprises a display comprising the matrix of one hundred nonlocking illuminated keys. The one hundred keys and the integrally mounted lamps of this display are associated on a one-for-one basis with the corresponding one hundred PBX subscriber stations.

Figures 2, 9:
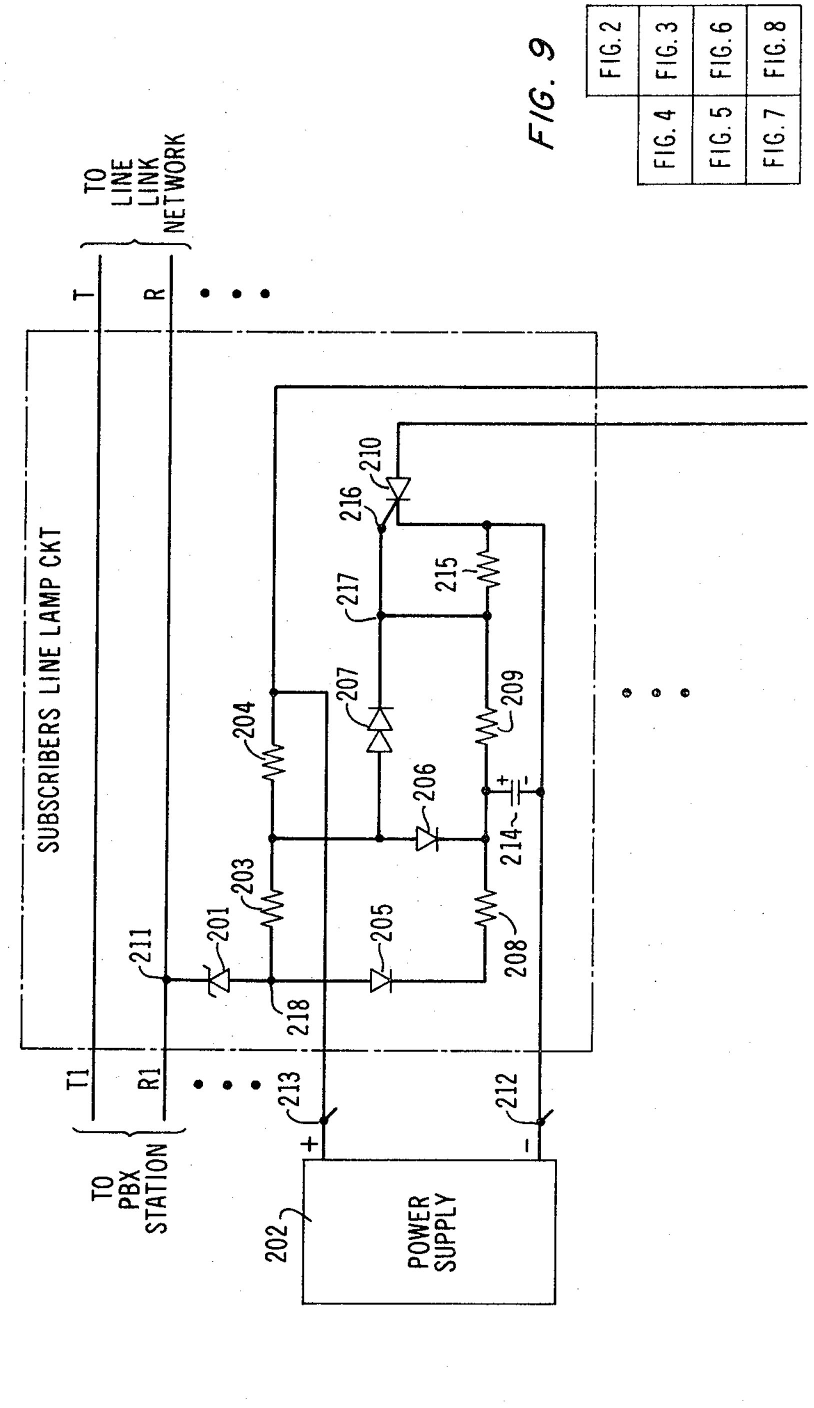
FIGS. 2 through 6 arranged as shown in FIG. 9 are a schematic diagram of Direct Station Selection apparatus for a PBX attendant.
FIG. 9 is a key diagram showing the arrangement of FIGS. 2 through 6.

As shown in FIG. 1, the PBX subscriber stations 173, 174 have associated therewith lines 164 and 165, respectively. A representative subscriber's line and lamp circuit is shown in FIG. 2. The T and R terminals of FIG. 2 are connected to the line link network of the switching system in the telephone central office while the T1 and R1 terminals are connected to the respective PBX station.

The subscriber's line circuit of FIG. 2 is arranged to illuminate the lamps 301 under the following conditions: (1) when the PBX subscriber station is in the off-hook state, and (2) when ringing current is applied to the T and R conductors from the central office.

The line circuit (not shown) in the central office provides ground potential on the T conductor and −48 volts on the R conductor. When the PBX subscriber station is in the off-hook state the flow of current in the line is such that the potential at point 211 drops below −40 volts, i.e., more positive than −30 volts. The power supply 202 which serves to light the lamps such as 301 provides a half-wave rectified output signal having base-to-peak voltage of approximately 14 volts. The base or reference voltage at the negative terminal 212 is approximately −40 volts and the rectified signal is in a positive direction from that base potential. Accordingly, on an average basis the potential at the terminal 213 is approximately −30 volts with respect to ground, while the potential at terminal 212 is approximately −40 volts with respect to ground. The lamp 301 is energized under the control of a silicon controlled rectifier 210. When the PBX subscriber station is in the on-hook state the voltage at point 211 will be approximately −48 volts and this serves to foward-bias the zener diode 201 to provide a back-bias on the diodes 205, 206, and 207. Under this condition the silicon controlled rectifier 210 will be in the OFF state. When the PBX subscriber station goes off-hook the potential at point 211 will fall below −40 volts and the diode 201 will cease to conduct. Accordingly, the −30 volt signal at terminal 213 of the power supply 202 will be applied through resistor 204 to forward-bias the multiple element silicon forward threshold diode 207. This places a positive control signal on the gate terminal 216 of the silicon controlled rectifier 210 and serves to energize the lamp 301.

Should the subscriber proceed to originate a call by use of a dial, the potential at point 211 will rise and fall with the dial pulses. In order to maintain the lamp 301 illuminated steadily there is provided the capacitor 214 and a path for charging that capacitor to a voltage such that the silicon controlled rectifier 210 will be held on during the dial pulse break intervals. The charging path for the capacitor 214 comprises the diode 206 which is a single element diode and therefore has a lower forward threshold voltage than the multiple element diode 207. Accordingly, the capacitor 214 charges to a voltage which is higher than the voltage which results at point 217 from conduction of the diode 207. During the dial pulse open periods the diode 201 will become forward-biased and the diodes 206 and 207 back-biased. During these intervals the energy in the capacitor 214 is discharged through the resistors 209 and 215 to maintain the gate terminal 216 in an ON state.

The ringing current which is applied to a line from the central office comprises bursts of 105 volt, 20 cycle signals with approximately six seconds between bursts. The ringing current is superimposed on the −48 volts; therefore, during the positive cycles of ringing the zener diode 201 is biased beyond its reverse breakdown voltage and the point 218 goes massively positive with respect to the voltages at the output of the power supply 202. During the reverse breakdown of the zener diode 201, the multiple element diode 207 is forward-biased by a signal through resistor 203 and the silicon controlled rectifier 210 is gated to the ON state to energize the lamp 301. During dial pulsing the capacitor 214 is charged to a voltage such that there is sufficient energy stored in the capacitor to maintain the silicon controlled rectifier 210 in the ON state during the inter-pulsing periods. During receipt of ringing the capacitor 214 is charged through the diode 205 to a much higher charge, namely, a charge which is sufficient to hold the gate terminal 216 in the ON state for the four second period between bursts of ringing current.

After a PBX subscriber has gone to the on-hook state the lamp 301 will be extinguished within approximately 120 milliseconds since the energy stored in the capacitor 214 will maintain the rectifier 210 in the ON state for that period of time.

The subscriber line lamps are provided to give the attendant an indication of the busy and idle states of the lines of the PBX.

The direct station selection equipment is provided to simplify the attendant actions in completing a call to a PBX subscriber station. The attendant always answers incoming calls on a loop circuit by the depression of the loop key associated therewith and by again depressing that key subsequent to answer to obtain dial tone and a connection to a digit receiver.

The direct station selection equipment is arranged so that after obtaining dial tone an attendant may merely depress the nonlocking key associated with the called PBX subscriber station and then proceed to answer another call. The direct station selection equipment in response to the depression of one of the line keys provides control actions as follows: (1) registers the identity of the called line in preparation for transmitting that identity to the central office, (2) transmits the identity of the called PBX station, (3) resets the register, and (4) transmits a break to the central office to request connection of calling party and releases the connection between the Direct Station Selection circuitry and the loop circuit.

Figure 3:
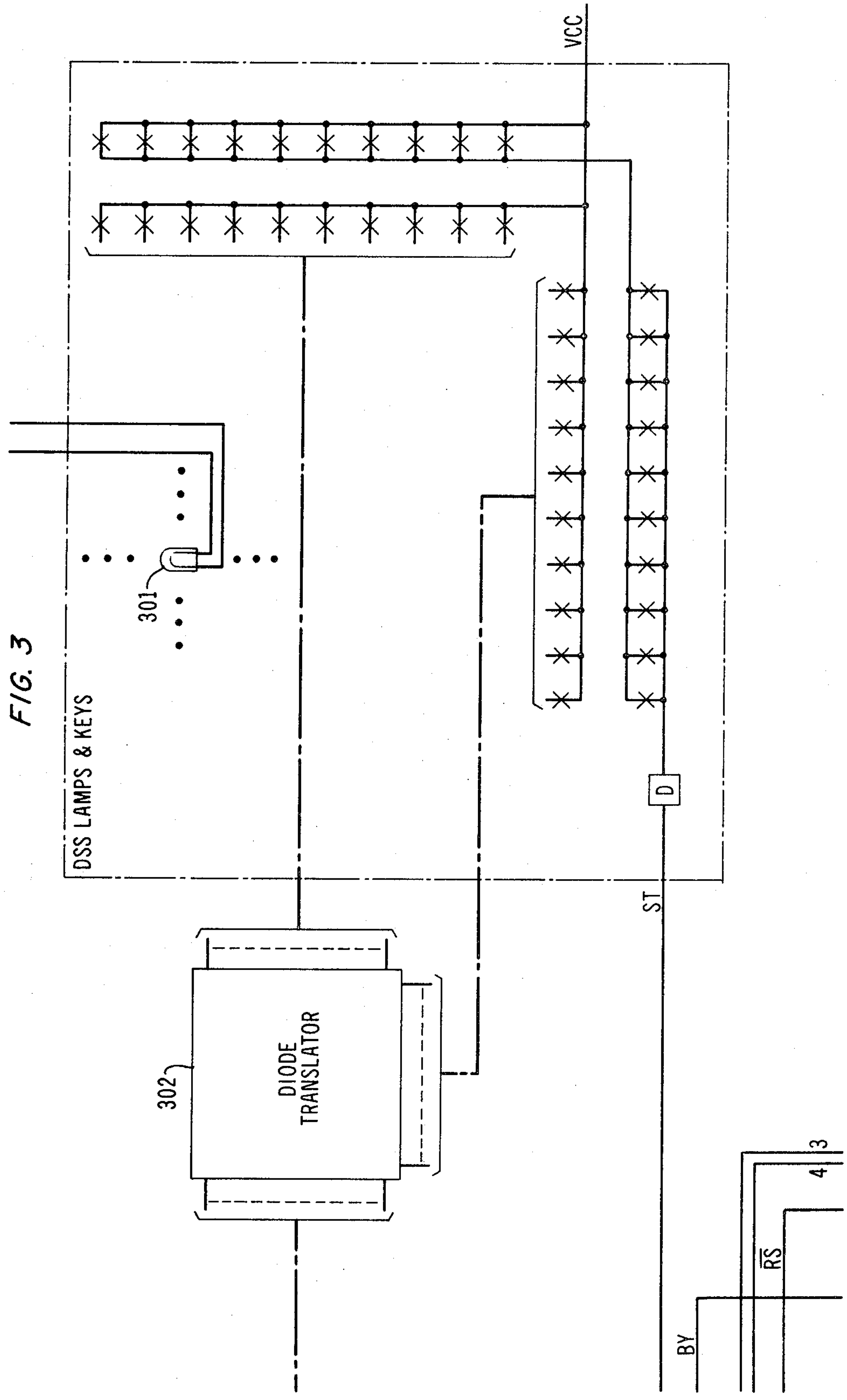
Figure 4:
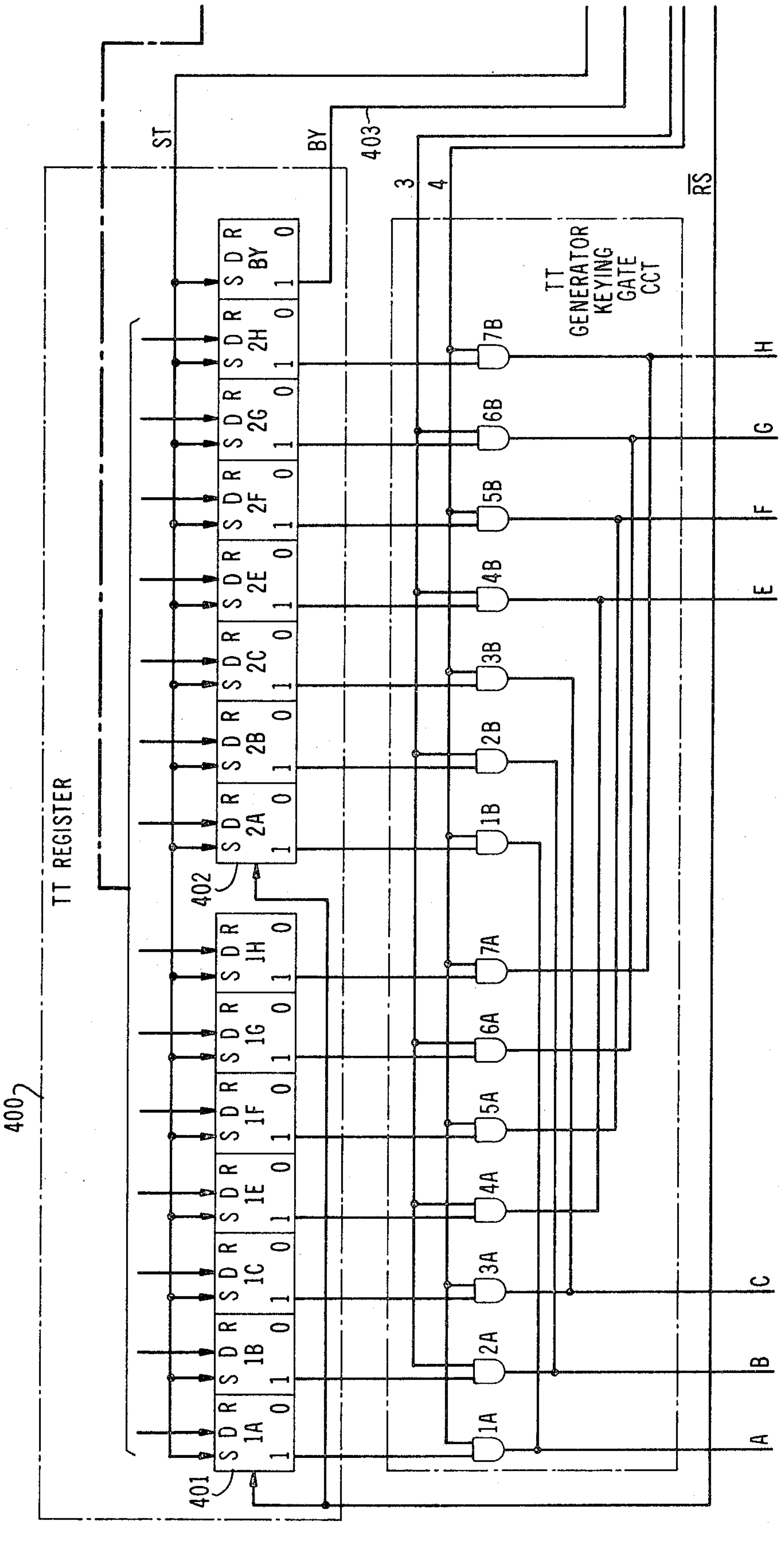
Figure 5:
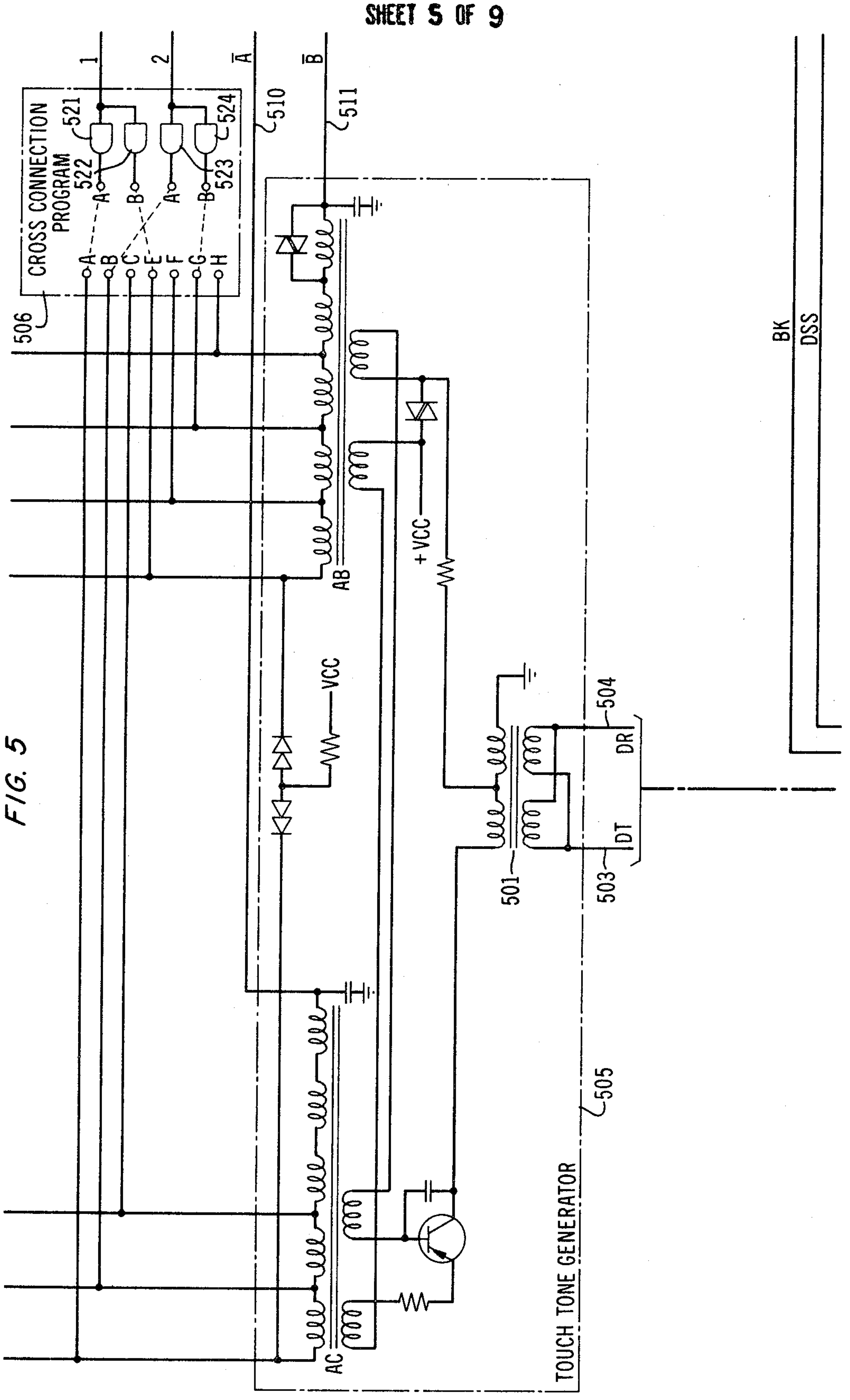

The direct station selection keys of FIG. 3 provide input signals to the diode translator 302. The purpose of the diode translator is to convert the key signals to signals for setting the elements of the TOUCH-TONE register 400 of FIG. 4. As is common in TOUCH-TONE signaling each digit is represented by two tones from a set of seven tones. The TOUCH-TONE register 400 comprises two register sections 401 and 402 for storing the two digits represented by the depressed key. Accordingly, in response to the depression of one of the keys in FIG. 3, the diode translator 302 produces signals setting two of the seven flip-flops 1A through 1H of the register section 401 and two flips-flops of the seven flip-flops 2A through 2H of the register section 402.

Figure 6:
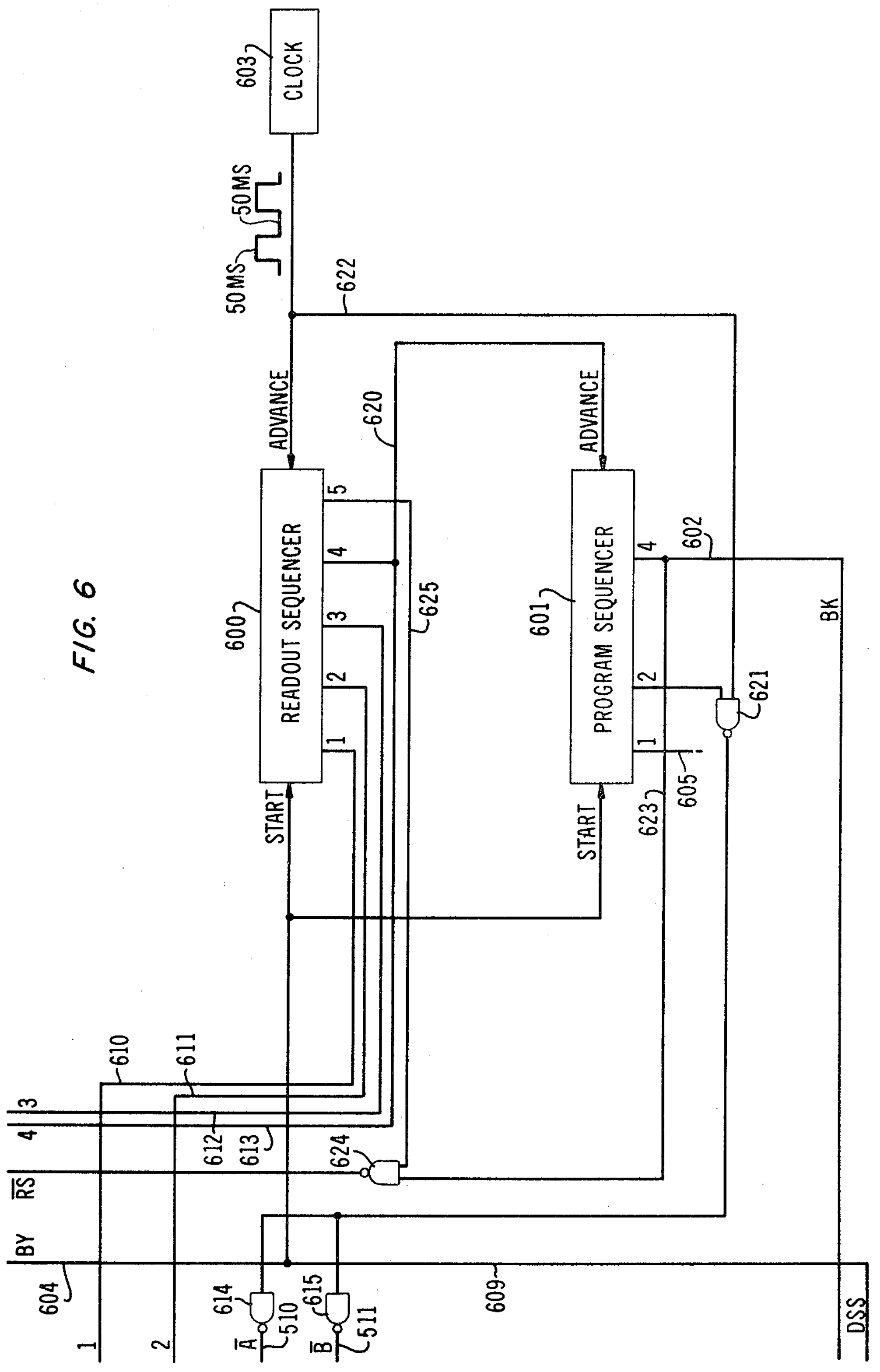

The register circuit comprises an ST lead which is energized to seize the register while the BY lead indicates to the circuit arrangements of FIG. 6 that a number has been stored in the register.

In FIG. 6 there is shown a program sequencer 601 and a readout sequencer 600. The purpose of the program sequencer is to advance the actions of the direct station selection equipment through their appropriate sequences while the function of the readout sequencer 601 is to effect the transmission of the four digits required to select the called PBX subscriber station. The BY conductor indicates to the program sequencer 600 that digits to be outpulsed have been registered.

The registration of the two digits in the register sections 401 and 402 completes the attendant action except for subsequent supervision of the call for answer. The remaining actions required to complete the call to the called PBX subscriber station are under the control of the sequencer circuits of FIG. 6 and the telephone switching system of the central office.

The readout sequencer 601 is a "one hot" shift register wherein the "1" is advanced through the sequencer under control of the clock circuit 603. The clock is arranged to generate pulses having a 50 millisecond duration with 50 milliseconds between pulses. Operation of the readout sequencer 601 and the program sequencer 600 is initiated by a high signal on the BY conductor 604. The readout sequencer 601 comprises five stages; therefore, one cycle of the sequencer requires 500 milliseconds.

The program sequencer 600 is a four-stage "one hot" shift register circuit. The program sequencer 600 is advanced by output signals from the fourth stage of the readout sequencer 601. Accordingly, the program sequencer will remain in the stage 1 state (a high signal condition on the output conductor of stage 1) for 400 milliseconds and will remain in the stage 2 state and subsequent stage states for 500 milliseconds per stage.

When the sequencer 601 receives a high signal at the START input terminal on the BY conductor 604, the stage 1 output conductor 605 is set in the high signal state. Since the first 400 milliseconds of the program sequence is utilized as a delay to assure completion of actions within the switching system of the telephone central office, the stage 1 conductor 605 is unconnected.

During the first cycle of operation of the readout sequencer 600 the output signals therefrom, with the exception of the output on the stage 4 output conductor 620, will not be utilized. The output conductors of stages 1 through 5 of the readout sequencer are connected to their respective utilizing circuits as will be discussed later herein. However, in each case no useful work will be performed until the appropriate conditions exist in the output conductors of the program sequencer 601.

At the same time that the readout sequencer 600 and the program sequencer 601 are set into action by the high signal on the BY conductor 604, steps must be taken in the loop circuit of FIG. 8 to connect the direct station selection equipment to the line at the central office. The BY conductor 604 is shown leaving the bottom of FIG. 6 labeled as the DSS conductor 609. The DSS conductor is connected as an input to the attendant common equipment of FIG. 7 where the signals thereon are amplified and inverted by the amplifier 722, again inverted by the inverter 747 and transmitted to the loop circuit of FIG. 8 as the DSS1 conductor 744. The low output signal which occurs at the output of the amplifier-inverter 722 is an input to the gate 721 which serves to provide a high output signal on the ON1 conductor 743 which is also connected to the loop circuit of FIG. 8.

The high signal condition on the DSS1 conductor 744 in conjunction with the high signal on the conductor 825 serves to enable the gate 850 and thus set the DSS flip-flop 853. The resulting low signal condition on the conductor 8100 serves to enable the transistors 8101 and 8102 which connect the DT and DR conductors 503 and 504 to the line to the central office.

The high signal on the ON1 conductor 743 in conjunction with the high signal on the conductor 892 serves to enable the gate 896 and thus sets the off-normal flip-flop 880. As previously explained, the setting of the off-normal flip-flop 880 has no effect on the remaining circuitry of the loop circuit because of the coupling capacitor 890. The subsequent resetting of the off-normal flip-flop, however, will be effective to carry out the actions previously described.

At this point the flip-flops of the loop circuit are in the following states: the seize flip-flop 851, the hold flip-flop 852, the answer flip-flop 869, the DSS flip-flop 853, and the off-normal flip-flop 880 are all in the set state; and the ring flip-flop 857 is in the reset state. It should be noted that the setting of the DSS flip-flop 853 disables the gate 855 and disables the transistors 857, 858 to remove the attendant's telephone from the line to the central office.

It is assumed that the actions described above as occurring in the loop circuit of FIG. 8 and all of the necessary connections in the central office have been completed at the time the program sequencer 601 is advanced to the stage 2 state under control of the stage 4 output conductor of the readout sequencer 600. A high signal condition on the stage 2 output conductor in conjunction with the recurring high signal conditions on the clock output conductor 622 serves to enable the AND gate 621 and the inverting gates 614 and 615 to place high signal conditions on the $\overline{A}$ and $\overline{B}$ conductors 510 and 511, respectively. The $\overline{A}$ and $\overline{B}$ conductors 510 and 511 are in the low signal condition at all times other than when the program sequencer 601 is in the stage 2 state, and these conductors alternate between the high signal condition and the low signal condition in synchronism with the output of the clock 603 during the time that the program sequencer is in the stage 2 state. Thus, the $\overline{A}$ and $\overline{B}$ conductors are in the high signal stage for 50 milliseconds and in the low state for 50 milliseconds so long as the program sequencer is in the stage 2 state. A low signal condition on the $\overline{A}$ and $\overline{B}$ conductors 510 and 511 inhibits the generation of TOUCH-TONE signals by the TOUCH-TONE generator 505 while a high signal condition on these conductors permits TOUCH-TONE signals to be generated in accordance with the connections which are established between the register sections 401 and 402 and the TOUCHTONE generator by the enablement of the gates 1A through 7A and 1B through 7B. Similarly, tones are generated by the enablement of the gates 521 through 524.

In the illustrative embodiment of the invention, the first two digits which identify the subscribers of the PBX station are prewired through the cross connection program 506. Since each TOUCH-TONE signal comprises the simultaneous generation of two tones, there is a need for two pairs of prewired connections in the illustrative example. That is, the outputs of the gates 521 and 522 to the appropriate ones of the terminals A through H constitute one pair of connections while the cross connection of the A and B conductors at the output of the gates 523 and 524 and the appropriate terminals A through H constitute the second pair of connections. During the time that the read-out sequencer 600 is in the stage 1 state and the program sequencer is in the stage 2 state, the gates 521 and 522 will be enabled and the two tones representing the first digit of the called PBX subscriber station will be transmitted via the transformer 501, the DT and DR conductors 503 and 504, the transistors 8101 and 8102, and the tip and ring conductors 801 and 802 to the central office via a line, e.g., 161. When the readout sequencer 600 is in the stage 2 state the gates 523 and 524 will similarly be enabled to transmit the two tones of the second digit of the number of the called PBX subscriber station. During the time that the readout sequencer 600 is in the stage 3 state the gates 1A through 7A will be enabled to connect the output conductors of the stages 1A through 1H of the first register section to the TOUCH-TONE generator to effect transmission of the two tones of the third digit; and when the readout sequencer is in the stage 4 state the gates 1B through 7B will be enabled to transmit the output signals of the stages 2A through 2H of the second register section 402 to the TOUCH-TONE generator and thus effect transmission of the fourth digit.

After outpulsing of the four digits has been completed the program sequencer 601 will be advanced to the stage 3 state in which it will remain for 500 milliseconds. No further control action is taken during this 500 millisecond interval and it is utilized only to assure completion of actions within the switching system of the telephone central office. At the end of the 500 millisecond period of delay the program sequencer 601 advances to the stage 4 state which is utilized to: (1) reset the TOUCH-TONE register sections 401 and 402; and (2) send a break to the loop circuit of FIG. 8 to disconnect the direct station selection equipment from the loop circuit and to send a break to the central office to request cut-through of the connection between the calling and called parties through the three port conference circuit.

The output of the stage 4 conductor of the program sequencer 601 is combined with the output of the stage 5 output conductor of the readout sequencer 600 to enable the gate 624 and thus provide a low signal condition on the RS conductor. This low signal condition serves to reset the stages 1A through 1H, 2A through 2H, and the BY flip-flop of the TOUCH-TONE register 400.

The stage 4 output conductor of the program sequencer is labeled the BK conductor 602 which is connected to the amplifier-inverter 723 in the attendant common equipment of FIG. 7. The output conductor of the amplifier 723 is the DBK conductor 746 which is one of the inputs to the loop circuit of FIG. 8. The low signal condition on the DBK conductor serves to disable the gate 8103 which turns off the transistor 864 and the lamp 863. During the time that the lamp 863 is off a break will be transmitted to the central office over the tip and ring conductors 801, 802 as previously described, with respect to a manually completed connection. This break will persist for approximately 500 milliseconds (until the program sequencer is again advanced and returns to the all "0" state). The low signal on the DBK conductor 746 also serves to reset the DSS flip-flop 853 and thus serves to disconnect the DT and DR conductors 503 and 504 from the central office line.

At this point in time the attendant may still be in a position to monitor the subject call or may have left the call to answer a call on another loop circuit. If the operator has remained in a position to monitor this connection the seize flip-flop 851 will be in the set state and the seize gate 835 will be enabled to cause the loop lamp 817 to flash at the 480 I.P.M. rate. However, if the attendant has gone to answer another connection, by having depressed another loop key, the seize flip-flop 851 will be in the reset state and the hold flip-flop 852, the answer flip-flop 869, and the off-normal flip-flop 880 will be in the set state and the loop lamp 817 will be illuminated in the wink condition under the control of the gate 876. This lamp condition will persist until such time as a break is received from the central office which indicates answer by the called PBX subscriber station. If the called party answers, the central office will transmit a break to the loop circuit over the tip and ring conductors 801 and 802. The loop detector circuit in the loop circuit will respond by energizing the transistor 879. This in turn enables the gate 881 to reset the off-normal flip-flop 880. As previously described when the flip-flop 880 is reset, the answer flip-flop 869 and the hold flip-flop 852 will be reset and the loop lamp 817 will be extinguished.

In summary, an incoming call may be answered by an attendant who completes the connection under manual control through the use of her nonlocking loop key and the TOUCH-TONE set of the attendant's console or alternatively, the attendant, after obtaining dial tone and connection of the loop circuit to a digit receiver, may complete the call action by depressing the direct station selection key of the PBX subscriber station being called and then proceed to answer another call. In either case, the attendant will obtain answer supervision as represented by the winking loop lamp and the attendant has the option of reentering a call in the event that answer is not forthcoming. Furthermore, where the attendant completes a call manually she has the option of providing "executive transfer" whereby the connection between the calling and called party is not completed until such time as the called party has been advised as to who is calling.

As noted earlier herein the switching system of the telephone central office includes provisions for limiting the number of simultaneous calls between the PBX (both those to and from subscriber stations of the PBX and the attendant) and lines and trunks outside the PBX.

In the illustrative central office switching system a record is maintained in the temporary memory of the number of simultaneous calls of the subject type. Each incoming call to the PBX can be identified by the originating class of service of the calling line and by the terminating class of service of the PBX main station directory number. Similarly, trunk calls to a PBX may be readily identified. Outgoing calls from the PBX are identified by the originating class of service and the registered call signaling information. Intra PBX calls are disregarded in this record as they are not limited in number by the subject arrangements.

When the PBX is installed it is assigned a fixed number of lines and a maximum number of simultaneous calls to and from lines outside the PBX and to and from trunks. When the allotted number is reached the central office returns busy tone to a calling subscriber.

It is to be understood that the specific telephone central office arrangements shown in FIG. 1 are for purposes of illustration only, and that other types of switching systems e.g., crossbar switching systems having dial transfer trunk circuits can also be employed in the implementation of my invention.

What is claimed is:

1. A central switching system serving a plurality of lines, a plurality of trunks, and at least one PBX and comprising: a communication switching network, a plurality of digit receivers, a plurality of conference circuits having at least three ports and control means responsive to calling signals from said lines and said trunks for controlling said switching system; one or more of said lines being assigned to a PBX main station directory number in the directory numbering plan of said central switching system and others of said lines being connected to PBX subscriber stations assigned calling numbers in the directory numbering plan of the PBX; and a private branch exchange attendant's console comprising: loop circuit means individually associated with and connected to said one or more lines assigned a PBX main station directory number; manually operated key means for controlling said loop circuit means to answer incoming calls, lamp means for monitoring the states of calls completed by said loop means, an attendant's telephone set including means for generating calling signals to identify PBX subscriber stations to which connections are to be completed; and said loop circuit means comprises means responsive to the operation of said key means and to signals generated by said central office for controlling said central office to control said conference trunk circuits, said digit receivers, and said switching network to complete connections between a calling line or trunk and a called PBX subscriber station defined by said signals generated by said means for generating calling signals.

2. A communication switching system serving a plurality of lines, a plurality of trunks, and at least one PBX and comprising: a communication switching network for selectively interconnecting said lines and trunks, a plurality of digit receivers, a plurality of conference circuits having at least three ports, and control means responsive to calling signals for controlling said switching system;

a Private Branch Exchange (PBX) comprising: an attendant's console, a plurality of PBX subscriber stations assigned identifying numbers in the directory numbering plan of said PBX; certain of said lines being connected to said attendant's console and assigned a PBX main station directory number in the directory numbering plan of said communication switching system, and others of said lines being connected to said PBX subscriber stations; and said attendant's console comprises means for answering incoming calls thereto and for generating control signals and call signaling information for controlling said switching system to complete connections through a selected one of said conference circuits between a line or trunk calling said PBX attendant's console and a PBX subscriber station identified by calling signals generated by said attendant's console.

3. A Private Branch Exchange attendant's console for generating control and call signaling signals for controlling connections to PBX subscriber stations assigned numbers in a PBX numbering plan and connected to lines of a central telephone switching system and for providing supervisory information to a PBX attendant comprising: at least one loop control circuit means connected to said telephone switching system by a line of that system which is assigned a PBX main station directory number in the numbering plan of said switching system, key means individually associated with each of said loop control circuit means for generating control signals and call signaling generating means connectable individually to said loop control circuit means under the control of said key means, and lamp means equal in number and individually associated with said loop control circuit means, and means in said loop control circuit means for selectively energizing each of said lamp means from a plurality of individual signal sources for illuminating said lamp means in a manner characteristic of the connected signal source; and means in said loop circuit means responsive to control signals received over said line for releasing said loop control circuit means.

4. A telephone line circuit connected to a subscriber line comprising: supervisory state indicating means; a power source; gate means responsive to enable signals to connect said supervisory state indicating means to said power source; charge storage means; control means responsive to off-hook potential on said subscriber line and responsive to ringing current applied to said line for charging said charge storage means and for applying said enable signals to said gate means, said charge storage means being connected to said gate means so as to enable said gate means for a period of time after removal of said off-hook potential and after removal of said ringing potential from said subscriber line.

5. A telephone line circuit in accordance with claim 4 wherein said control means comprises diode means connected to said subscriber line so as to be conducting in the forward direction in response to the application of on-hook potential and nonconducting in response to said off-hook potential and having a predetermined reverse breakdown voltage, and said predetermined reverse breakdown voltage being of a value such that said ringing potential exceeds said reverse breakdown voltage.

6. A telephone line circuit in accordance with claim 4 wherein said control means in response to said off-hook potential on said subscriber line charges said charge storage means to a first value which is sufficient to enable said gate means for a first period of time; and said control means in response to said ringing current applied to said subscriber line charges said charge storage means to a second value which is sufficient to enable said gate means for a second period of time which exceeds said first period of time.

7. A central switching system in accordance with claim 1 further comprising: means for defining the maximum number of allowable simultaneous connections between said PBX and lines and trunks outside said PBX, means for maintaining a record of the current number of said simultaneous connections, and means for comparing said maximum number and said current number and for returning busy tone to further calls requesting such connections if said record of said current number of simultaneous connections equals said maximum allowable number of simultaneous connections.

* * * * *

UNITED STATES PATENT OFFICE
CERTIFICATE OF CORRECTION

Patent No. 3,740,485 Dated June 19, 1973

Inventor(s) Charles Nickerson

It is certified that error appears in the above-identified patent and that said Letters Patent are hereby corrected as shown below:

Column 1, line 43, "specific Centrix stations" should read --specific Centrex stations--. Column 2, line 18, delete "and"; line 20 "Fig. 1" should read --Fig. 1; and--. Column 5, line 48, "(480 I.P.M" should read --(480 I.P.M.)--. Column 6, line 4, "the conductors bypasses" should read --the conductors 801, 802.--. Column 6, line 9, "junction trough the" should read --junction through the--. Column 6, line 13, "transistor 860 b passes" should read --transistor 860 bypasses--. Column 6, line 49, "of the cell" should read --of the call--. Column 15, line 56, "TOUCHTONE" should read --TOUCH-TONE--. Column 16, line 48, "the RS conductor" should read --the $\overline{RS}$ conductor--.

Since the line numbering in the patent does not agree with the printed lines, all above references are to the actual line count.

Signed and sealed this 25th day of December 1973.

(SEAL)
Attest:

EDWARD M.FLETCHER,JR.
Attesting Officer

RENE D. TEGTMEYER
Acting Commissioner of Patents